US012362468B2

(12) United States Patent
Kang et al.

(10) Patent No.: US 12,362,468 B2
(45) Date of Patent: Jul. 15, 2025

(54) PIFA TYPE ANTENNA

(71) Applicant: OHSUNG ELECTRONICS CO., LTD., Busan (KR)

(72) Inventors: Min Woo Kang, Gyeongsangbuk-do (KR); Je Won Son, Gyeongsangnam-do (KR)

(73) Assignee: OHSUNG ELECTRONICS CO., LTD., Busan (KR)

( * ) Notice: Subject to any disclaimer, the term of this patent is extended or adjusted under 35 U.S.C. 154(b) by 129 days.

(21) Appl. No.: 18/301,504

(22) Filed: Apr. 17, 2023

(65) Prior Publication Data

US 2024/0258697 A1 Aug. 1, 2024

(30) Foreign Application Priority Data

Jan. 26, 2023 (KR) ........................ 10-2023-0009872

(51) Int. Cl.

*H01Q 1/38* (2006.01)
*H01Q 1/22* (2006.01)
*H01Q 9/42* (2006.01)

(52) U.S. Cl.

CPC ................. *H01Q 1/38* (2013.01); *H01Q 9/42* (2013.01); *H01Q 1/22* (2013.01)

(58) Field of Classification Search

CPC ...... H01Q 1/22; H01Q 1/2208; H01Q 1/2291; H01Q 1/36; H01Q 1/38; H01Q 9/0414; H01Q 9/0421; H01Q 9/36; H01Q 9/42

See application file for complete search history.

(56) References Cited

U.S. PATENT DOCUMENTS 7,170,456 B2 * 1/2007 Kwak .................. H01Q 1/2283 343/702
2003/0179143 A1 9/2003 Iwai et al.
2014/0055309 A1 2/2014 Jenwatanavet
2015/0326071 A1 11/2015 Contopanagos et al.

FOREIGN PATENT DOCUMENTS

KR 10-2003-0063168 A 7/2003
KR 20100029419 A * 3/2010 ............... H01Q 9/42
KR 10-190399 9/2018
KR 10-1978237 5/2019

OTHER PUBLICATIONS

Korean Office Action dated Jun. 18, 2023 for corresponding Korean Application No. 10-2023-0009872 and English translation.

* cited by examiner

*Primary Examiner* — Robert Karacsony

(74) *Attorney, Agent, or Firm* — Rankin, Hill & Clark LLP

(57) ABSTRACT

Planar inverted-F antenna (PIFA) type antenna using antenna patterns formed on opposite ends of a PCB. The PIFA type antenna includes a first antenna pattern provided on an upper surface of a PCB; a second antenna pattern provided on a lower surface of the PCB; and a via provided in the PCB and connecting the first antenna pattern with the second antenna pattern.

5 Claims, 8 Drawing Sheets

PIFA TYPE ANTENNA

CROSS REFERENCE TO RELATED APPLICATION

The present application claims priority to Korean Patent Application No. 10-2023-0009872, filed Jan. 26, 2023, the entire content of which is incorporated herein for all purposes by this reference.

TECHNICAL FIELD

The present disclosure relates to a planar inverted-F antenna (PIFA) type antenna. More particularly, the present disclosure relates to a PIFA type antenna using antenna patterns formed on opposite ends of a PCB.

BACKGROUND

Recently, a technology for remotely controlling various electronic devices used in a home with remote controls has become widespread, resulting in an increase in the number of remote controls held in each home.

As the number of remote controls used in a home has increased, managing the remote controls and finding the remote controls when required has become difficult, leading to the development of an integrated remote control that integrates the functions of multiple remote controls.

The integrated remote control stores a control program for controlling a plurality of electronic devices with one remote control. The integrated remote control outputs a control signal for controlling an electronic device to be controlled.

In general, PIFA type antennas require a large amount of physical space for antenna pattern design to implement a desired resonance frequency. Recently, remote control products have many built-in components and are manufactured in small size, making it difficult to secure antenna design space.

In a conventional technology for adjusting a resonance frequency by using a capacitor element at a distal end of an antenna, an additional capacitor element needs to be applied in order to optimize the resonance frequency and the number of elements is increased to obtain a desired resonance frequency, and costs are also increased accordingly.

In addition, antennas are currently realized on PCBs of remote controls, rather than being realized as separate components. In addition, as the antenna are realized on the PCBs, the antennas on the PCBs are required to be in minimal size because of spatial limitation of the PCBs.

The foregoing is intended merely to aid in understanding the background of the present disclosure, and is not intended to mean that the present disclosure falls within the purview of the related art that is already known to those skilled in the art.

Documents of Related Art are as follows.

(Patent Document 1) Korean Patent No. 10-1978237 (title: MICRO DOUBLE BAND ANTENNA); and (Patent Document 2) Korean Patent No. 10-1903990 (title: DUAL BAND SLOT ANTENNA).

BRIEF SUMMARY

The present disclosure is directed to providing an antenna with a minimal size.

In addition, the present disclosure is directed to providing an antenna capable of realizing a resonance frequency by using a minimum number of components.

In addition, the present disclosure is directed to providing a method of generating capacitance and inductance by using antenna patterns.

In addition, the present disclosure is directed to providing a method of realizing an antenna on a PCB.

In addition, the present disclosure is directed to providing a method of adjusting a resonance frequency easily.

According to the present disclosure, there is provided a PIFA type antenna including: a first antenna pattern provided on an upper surface of a PCB; a second antenna pattern provided on a lower surface of the PCB; and a via provided in the PCB and connecting the first antenna pattern with the second antenna pattern.

According to the PIFA type antenna of the present disclosure, an antenna resonance frequency can be adjusted by adjusting the inductance of the spiral-shaped antenna pattern connected, through the via, with the pattern formed on the upper surface of the PCB, and a frequency band can be easily adjusted by slightly modifying the width and the length of the line of the antenna pattern. In addition, the PIFA type antenna of the present disclosure does not use additional external capacitor elements for generating capacitance, resulting in cost savings.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

The aforementioned and additional aspects of the present disclosure will be more apparent through an exemplary embodiment described with reference to the accompanying drawings. Hereinafter, the embodiment of the present disclosure will be described in detail so that those skilled in the art can easily understand and reproduce the embodiment.

The present disclosure proposes a method of connecting a first antenna pattern formed on an upper surface of a PCB with a second antenna pattern formed on a lower surface of the PCB, by using a via. In addition, the present disclosure proposes a method of adjusting a resonance frequency by modifying a width and a length of a line of the second antenna pattern. First, the first antenna pattern formed on the upper surface of the PCB will be described. Next, the second antenna pattern formed on the lower surface of the PCB will be described.

Figure 1:
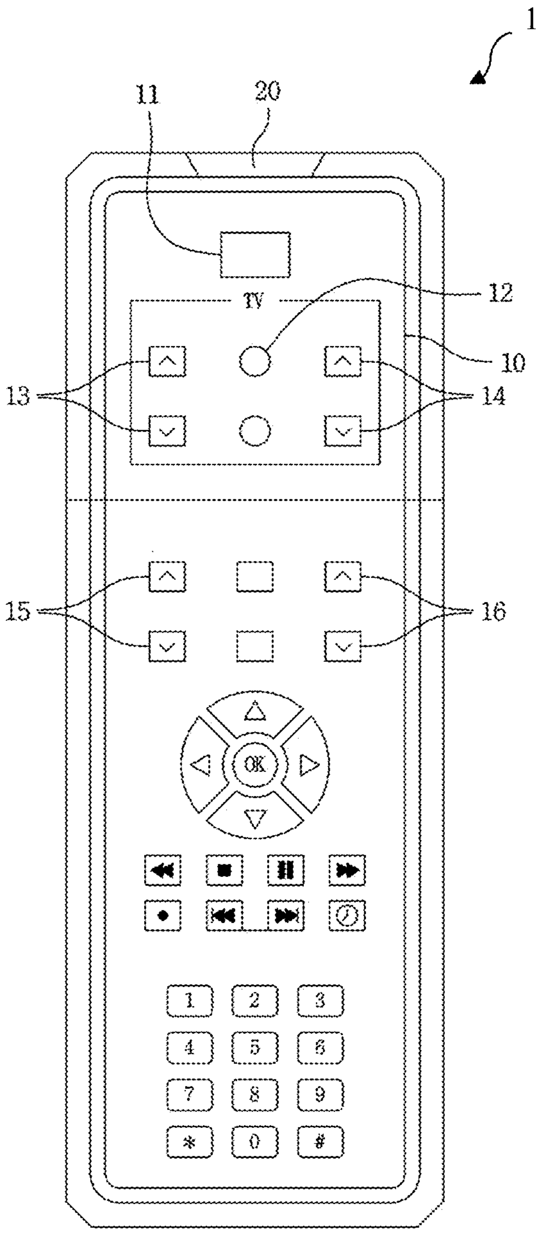
FIG. 1 shows an example of a remote control.

FIG. 1 illustrates an example of a remote control.

The remote control 1 is equipped with an input module 10 and a communication module 20. The input module is equipped with multiple buttons including a set-top box power button 11 for turning on or off the power of a set-top box, a TV power button 12 for turning on or off the power of a TV, a TV volume change button 13, and a TV channel change button 14, a set-top box volume change button 15, and a set-top box channel change button 16. In addition, although not shown in FIG. 1, the remote control includes the communication module to communicate with external devices, such as set-top boxes. An example of the communication module is an antenna.

Figure 2:
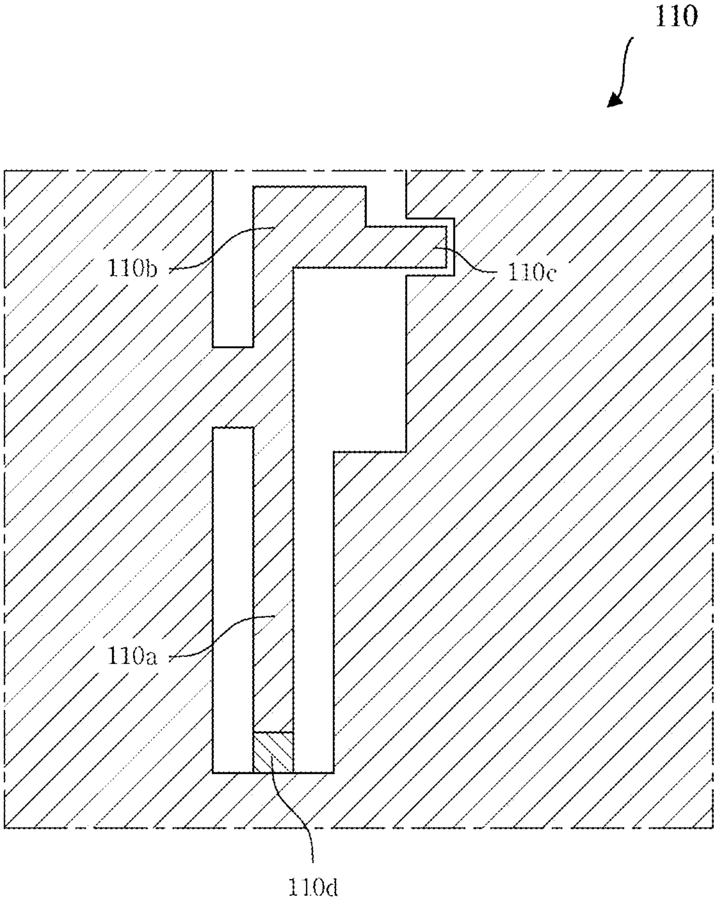
FIG. 2 shows a first antenna pattern according to an embodiment of the present disclosure.

FIG. 2 shows the first antenna pattern according to an embodiment of the present disclosure. Hereinafter, the first antenna pattern according to the embodiment of the present disclosure will be described in detail with reference to FIG. 2.

As shown in FIG. 2, a planar inverted-F antenna (PIFA) type antenna is formed on a PCB. On the PCB, a portion of an area in which the ground is formed is removed to form an antenna, and the antenna is formed in the area in which the ground is removed.

Hereinafter, the area in which the ground is removed is referred to as an antenna pattern formation area. That is, the PIFA type antenna 100 is formed in the antenna pattern formation area, which is a part of the ground area formed on the PCB.

The first antenna pattern 110 includes a first part 110*a* formed in a first direction, and a second part 110*b* formed in a second direction, which is a direction that is turned away from the first part 110*a*.

As shown in FIG. 2, the width of the first part 110*a* is relatively narrower than the width of the second part 110*b*. The first antenna pattern 110 includes a third part 110*c* that extends in the same direction as the second part 110*b*, and has a width relatively narrower than that of the second part 110*b*. Either the upper line or the lower line of the second part 110*b* extends to constitute either the upper line or the lower line of the third part 110*c*.

Either the upper line or the lower line of the third part does not extend in a straight line to either the upper line or the lower line of the second part such that the width of the third part 110*c* is relatively narrower than the width of the second part 110*b* as described above.

At the lower end of the first part 110*a* of the first antenna pattern 110, a feed point 110*d* for feeding is formed. The middle of the first part 110*a* is connected to the ground. In addition, the characteristics of the antenna vary depending on a point connected to the ground within the first part 110*a*.

Regarding the present disclosure, a capacitance component of the PIFA type antenna is formed by the third part 110*c*. That is, as shown in FIG. 2, the capacitance component is formed between the upper line and the lower line of the third part 110*c*, and the resonance frequency varies depending on the length of the third part 110*c*. That is, the resonance frequency of the antenna is adjustable by modifying the length of the third part 110*c*.

Figure 3:
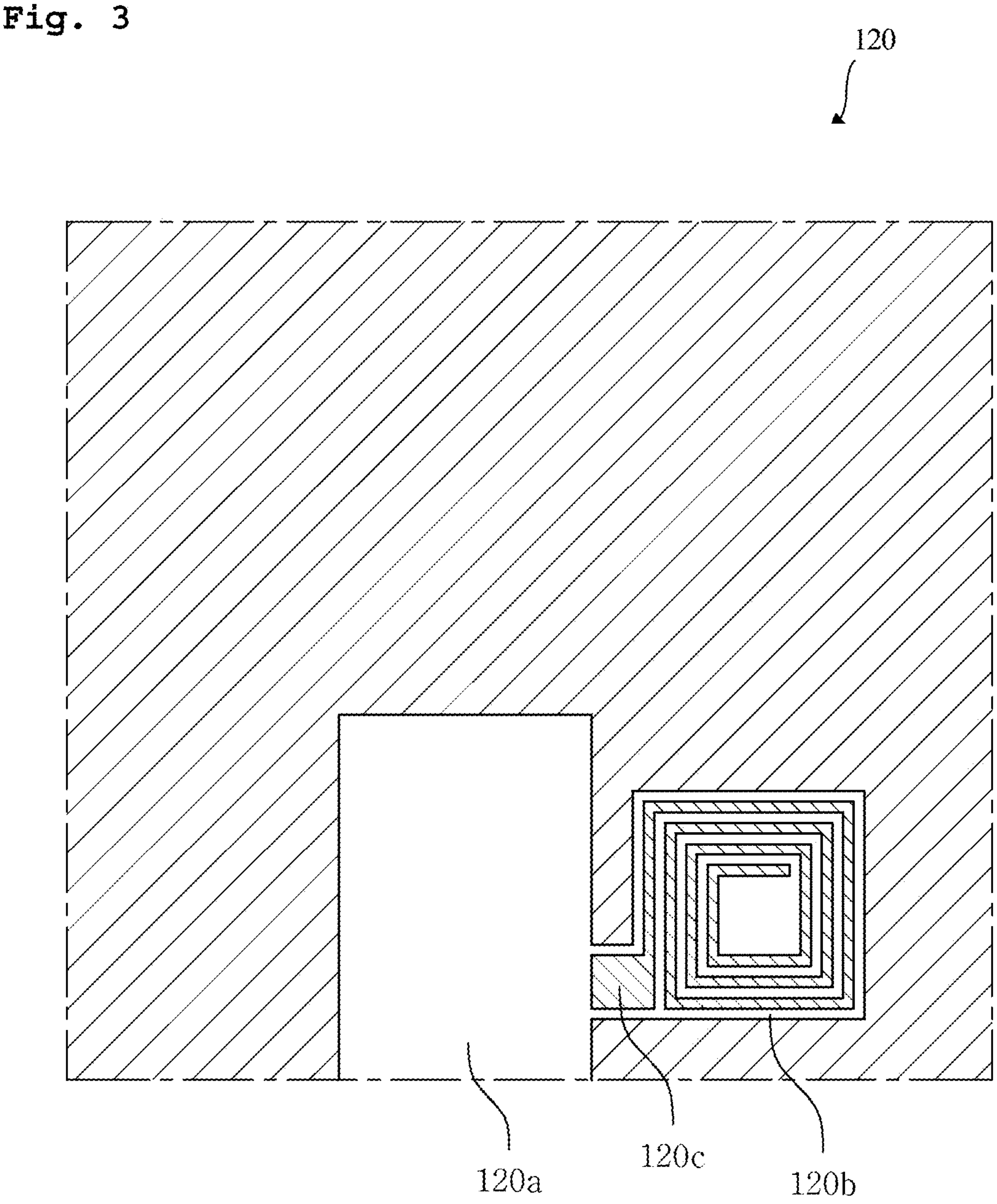
FIG. 3 shows a second antenna pattern according to the embodiment of the present disclosure.

FIG. 3 shows the second antenna pattern according to the embodiment of the present disclosure. Hereinafter, the second antenna pattern according to the embodiment of the present disclosure will be described in detail with reference to FIG. 3.

As shown in FIG. 3, the planar inverted-F antenna (PIFA) type antenna 100 is formed on the PCB. On the PCB, a portion of an area in which the ground is formed is removed to form an antenna, and the antenna is formed in the area in which the ground is removed.

Hereinafter, as described above, the area in which the ground is removed is referred to as an antenna pattern formation area. That is, the PIFA type antenna is formed in the antenna pattern formation area, which is a part of the ground area formed on the PCB.

For the PIFA type antenna 100, the second antenna pattern 120 is formed in a spiral shape in the antenna pattern formation area. The antenna pattern formation area includes a first antenna pattern formation area 120*a* and a second antenna pattern formation area 120*b*. The first antenna pattern formation area 120*a* is in a rectangular shape, and the second antenna pattern formation area 120*b* extends from the first antenna pattern formation area 120*a*. Regarding the present disclosure, the second antenna pattern in a spiral shape is formed in the second antenna pattern formation area 120*b*.

In the center of the second antenna pattern 120, a square-shaped area with the ground removed is located, and the second antenna pattern is formed in a spiral shape from the square-shaped area.

To elaborate, one distal end of the second antenna pattern 120 is connected to the first antenna pattern formation area 120*a*, and the other distal end of the second antenna pattern 120 is connected to the second antenna pattern formation area 120*b* in a square area.

Regarding the present disclosure, the width of the line of the spiral-shaped pattern is narrower than the width of a connection line 120*c* connecting the second antenna pattern with the first antenna pattern formation area. In addition, as shown in FIG. 3, starting from the connection line 120*c*, the second antenna pattern is formed in a spiral shape in the second antenna pattern formation area 120*b*.

Figure 4:
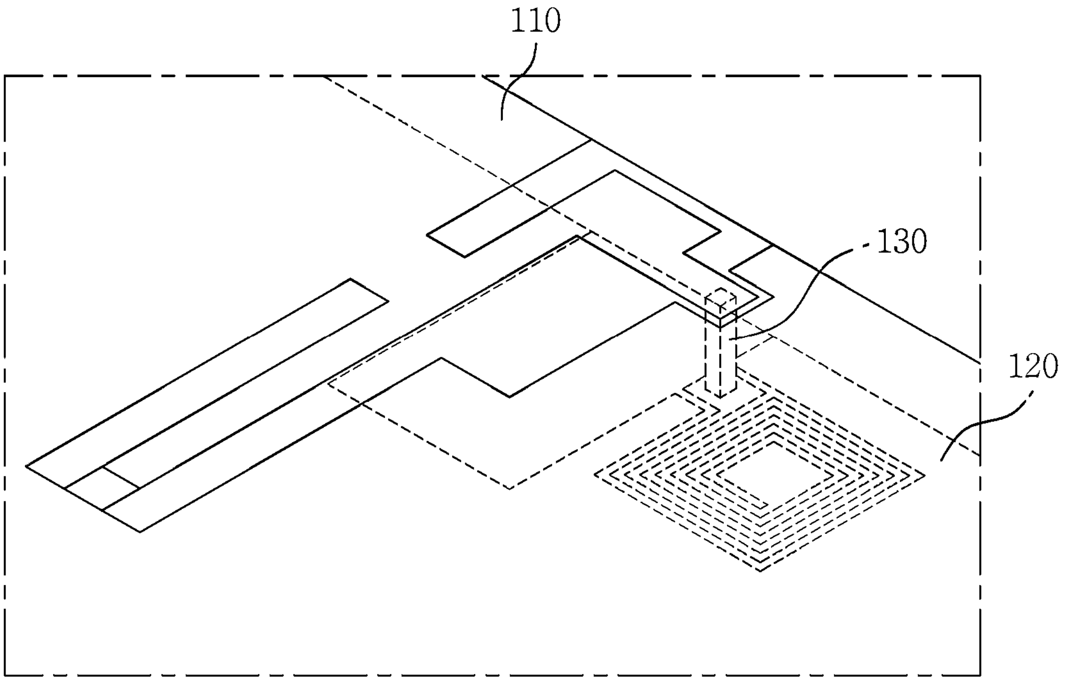
FIG. 4 shows an example configuration in which the first antenna pattern and the second antenna pattern according to the embodiment of the present disclosure are connected to each other by a via.

FIG. 4 shows an example in which the first antenna pattern and the second antenna pattern according to the embodiment of the present disclosure are connected to each other by a via. As shown in FIG. 4, the first antenna pattern and the second antenna pattern according to the embodiment of the present disclosure are connected to each other by the via.

As shown in FIG. 4, the first antenna pattern and the second antenna pattern are connected to each other by the via. In particular, the third part of the first antenna pattern and the connection line of the second antenna pattern are connected to each other by the via.

According to the present disclosure, while the first antenna pattern is formed on the upper surface of the PCB and the second antenna pattern is formed on the lower surface of the PCB, the first antenna pattern and the second antenna pattern are connected to each other by the via.

Figure 5:
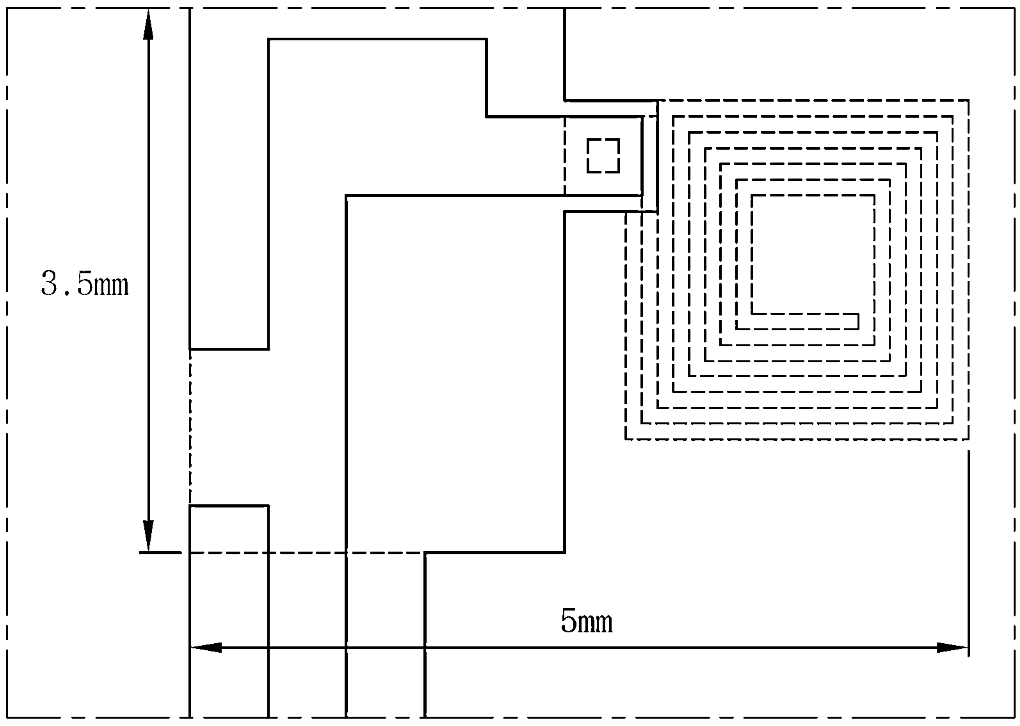
FIG. 5 shows an example size of a PIFA type antenna according to the embodiment of the present disclosure.

FIG. 5 shows a size of a PIFA type antenna according to the embodiment of the present disclosure.

As shown in FIG. 5, regarding the size of the PIFA type antenna proposed in the present disclosure, the length in the horizontal direction is 5 mm, and the length in the vertical direction is 3.5 mm. The size of the PIFA type antenna is the same when the first antenna pattern and the second antenna pattern are overlapped. In addition, the vertical length of the PIFA type antenna is equal to the vertical length of the first antenna pattern formation area constituting the second antenna pattern.

Figure 6:
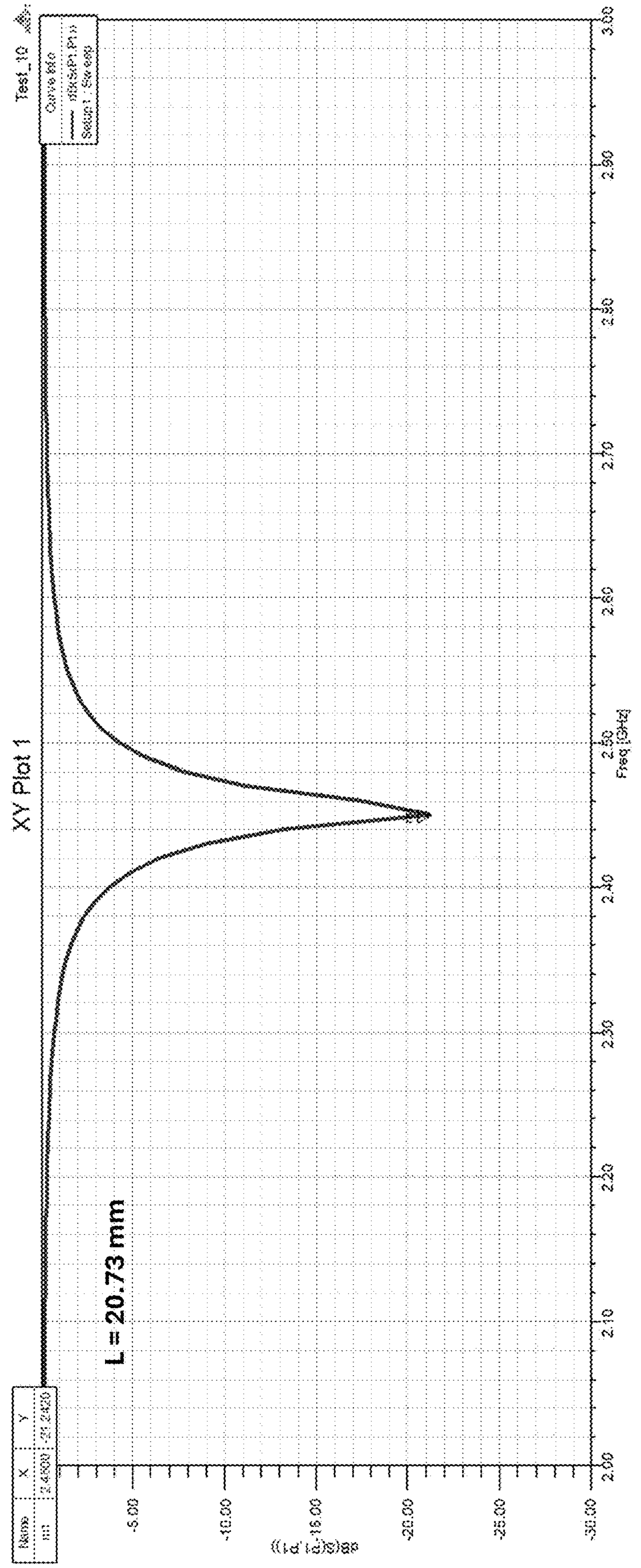
FIGS. 6 to 8 show different resonance frequencies depending on the width or length of a line of the second antenna pattern, according to the embodiments of the present disclosure.
Figure 7:
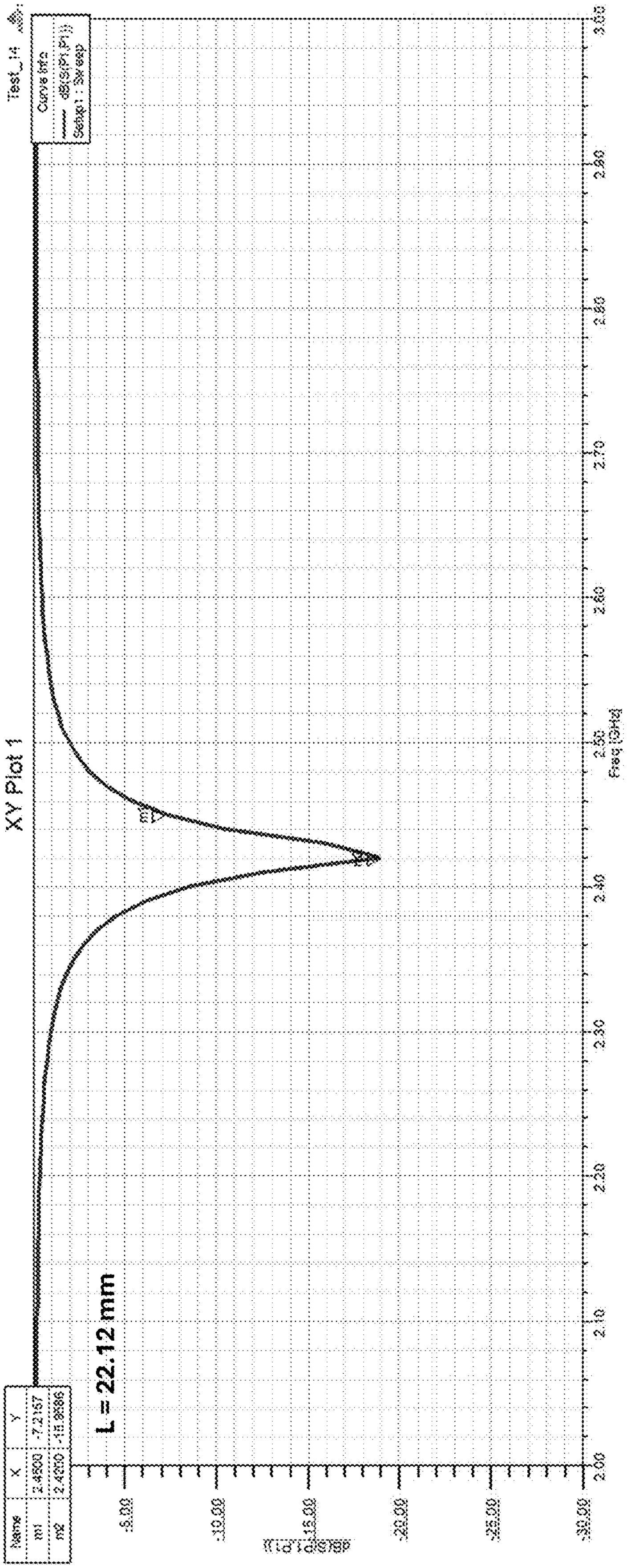
Figure 8:
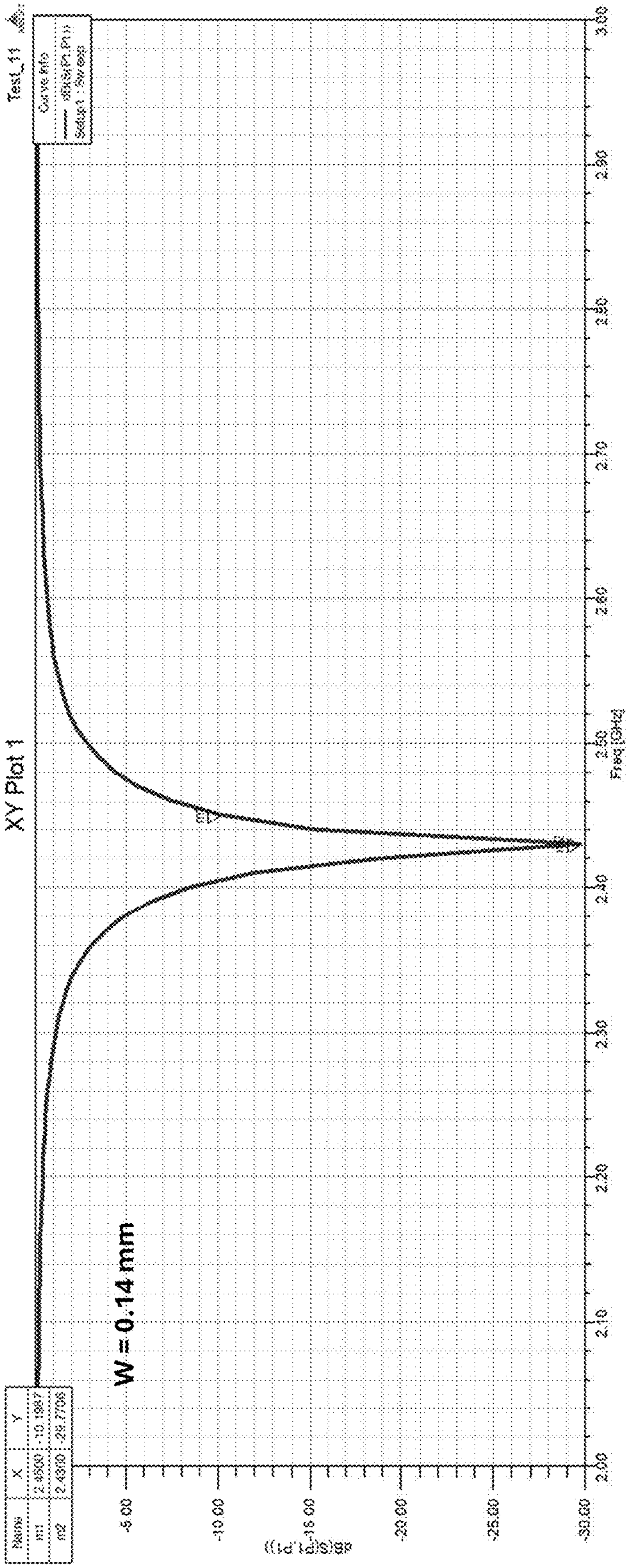

FIGS. 6 to 8 show several different resonance frequencies depending on the width or length of the line of the second antenna pattern according to the embodiment of the present disclosure. In particular, FIG. 7 shows an example in which the length of the line of the second antenna pattern is adjusted, and FIG. 8 shows an example in which the width of the line of the second antenna pattern is adjusted. That is, FIGS. 7 and 8 show a method of adjusting the resonance frequency by adjusting the inductance according to the second antenna pattern.

FIG. 6 shows the resonance frequency when the length of the second antenna pattern of the PIFA type antenna is 20.73 mm and the width is 0.1 mm. In this case, it was found that the resonance frequency is 2.45 GHz.

FIG. 7 shows the resonance frequency when the length of the second antenna pattern is 22.12 mm and the width is 0.1 mm. In this case, it was found that the resonance frequency is 2.42 GHz.

FIG. 8 shows the resonance frequency when the length of the second antenna pattern is 20.73 mm and the width is 0.14 mm. In this case, it was found that the resonance frequency is 2.43 GHz.

As described above, the present disclosure proposes a method of adjusting the inductance by modify the length or width of the second antenna pattern and of adjusting the resonance frequency of the antenna as the inductance is adjusted.

The present disclosure has been described with reference to an exemplary embodiment illustrated in the drawings for illustrative purpose, and those skilled in the art will understand that the present disclosure may be modified in various ways and that other equivalent embodiments are possible.

What is claimed is:

1. A planar inverted-F antenna (PIFA) antenna, comprising:

a first antenna pattern provided on an upper surface of a PCB, wherein the first part is configured to receive current, and is in a straight line shape with a first width;

a second antenna pattern provided on a lower surface of the PCB, wherein the second part is extended from one end of the first part in a perpendicular direction, and has a second width;

a third part extending from a distal end of the second part in a straight line in a same direction as the second part, and has a third width that is relatively narrower than the second width; and a via provided in the PCB and connecting the first antenna pattern with the second antenna pattern.

2. The PIFA antenna of claim 1, wherein an antenna pattern formation area in which a ground is removed is provided on the upper surface of the PCB, and the first antenna pattern is provided in the antenna pattern formation area.

3. The PIFA antenna of claim 1, wherein a first antenna pattern formation area and a second antenna formation area in which a ground is removed are provided on the lower surface of the PCB, and the second antenna pattern is provided in a spiral shape in the second antenna formation area.

4. The PIFA antenna of claim 3, further comprising a connection line connecting the first antenna pattern formation area with the second antenna pattern, wherein the via connects the connection line with the third part.

5. The PIFA antenna of claim 4, wherein a width of the connection line is relatively greater than a width of the second antenna pattern.

* * * * *